United States Patent
Morroni et al.

(10) Patent No.: US 7,956,592 B2
(45) Date of Patent: Jun. 7, 2011

(54) MONITORING AND CONTROL OF POWER CONVERTERS

(75) Inventors: Jeffrey Morroni, Littleton, CO (US); Dragan Maksimovic, Boulder, CO (US); Regan Zane, Superior, CO (US)

(73) Assignee: The Regents of The University of Colorado, Denver, CO (US)

( * ) Notice: Subject to any disclaimer, the term of this patent is extended or adjusted under 35 U.S.C. 154(b) by 97 days.

(21) Appl. No.: 12/484,023

(22) Filed: Jun. 12, 2009

(65) Prior Publication Data

US 2009/0309567 A1 Dec. 17, 2009

Related U.S. Application Data

(60) Provisional application No. 61/152,373, filed on Feb. 13, 2009, provisional application No. 61/061,486, filed on Jun. 13, 2008.

(51) Int. Cl.
*G05F 1/00* (2006.01)
(52) U.S. Cl. ........................................................ 323/283
(58) Field of Classification Search .................. 323/283, 323/284, 282
See application file for complete search history.

(56) References Cited

U.S. PATENT DOCUMENTS 7,719,248 B1 * 5/2010 Melanson ...................... 323/283

OTHER PUBLICATIONS

PCT International Search Report and Written Opinion issued Dec. 22, 2009 for PCT/US2009/047261, 8 pages.
International Preliminary Report on Patentability dated Dec. 23, 2010, 2 pages.

\* cited by examiner

*Primary Examiner* — Shawn Riley
(74) *Attorney, Agent, or Firm* — Snell & Wilmer, LLP

(57) ABSTRACT

A digital controller configured to inject a signal into a digital feedback path that facilitates regulation of a power converter and measure the corresponding phase, gain, or frequency. The digital controller may also include an adaptive tuning controller for adjusting power converter operating attributes based in part on the measurements. In an exemplary embodiment, the adaptive tuning controller uses the phase, gain, and/or frequency measurements to adjust the digital feedback signal. In an exemplary embodiment, the adaptive tuning controller compares the operating measurements with desired values and generates adjusted operating attributes. In accordance with an exemplary embodiment, the monitoring and adjusting of the digital feedback signal occurs while the digital controller is regulating a power signal in the power converter.

22 Claims, 13 Drawing Sheets

MONITORING AND CONTROL OF POWER CONVERTERS

PRIORITY

This application is a non-provisional of U.S. Provisional No. 61/152,373, filed on Feb. 13, 2009, and entitled "ROBUST ADAPTIVE TUNING OF DIGITALLY CONTROLLED SWITCHED-MODE POWER SUPPLIES" and further claims priority to U.S. Provisional No. 61/061,486, filed on Jun. 13, 2008, and entitled "METHOD, APPARATUS & SYSTEM FOR EXTENDED SWITCHED-MODE CONTROLLER", both of which are hereby incorporated by reference.

FIELD OF INVENTION

The present invention relates generally to power converters and, in particular, to power regulation systems, devices, and methods suitable for monitoring and controlling closed-loop power converters.

BACKGROUND OF THE INVENTION

Power converters include direct current ("DC")-DC, DC-alternating current ("AC"), AC-DC, and AC-AC configurations. DC-DC power converters are often used to provide regulated power to electrical loads in, for example, microelectronic devices. Typical power converter feedback loops are conservatively designed so that stability margins and closed-loop regulation performance are maintained over expected ranges of operating conditions and tolerances in power stage parameters.

Prior art power regulators are generally configured to maintain a desired power signal within a power converter. There are a variety of power signals which can be regulated including output voltage, output current, input voltage, input current, inductor current and capacitor voltage. As an example, a typical prior art power regulator can be configured to maintain the voltage, supplied to a dynamic load, at a nominal operating load voltage. Typical prior art voltage regulators (e.g., a switching regulator) may be effective in tracking the slow power changes in the dynamic load; however, the voltage regulators may not be able to suitably track fast changes. During operation of a dynamic load, transient power events may occur. If adjustments to such transient events are not rapidly made, the load may experience drops or spikes in the voltage, which may in turn deleteriously affect the performance of the load.

With reference now to FIG. 1, a typical prior art voltage regulator may comprise a power converter 100 and a controller 120. Power converter 100 may comprise passive components, such as inductors 150, capacitors 160, or transformers. Power converter 100 may also comprise power semiconductor devices operated as switches, such as transistors $Q_j$ and $Q_k$. These transistors may be controlled by logic-level on/off signals c, for example $C_j$ and $C_k$. Power converter 100 is configured to receive power from a supply voltage $V_g$ at its input, and to provide a regulated voltage signal at its output to a load 110. Typically, the output voltage is sensed and the sensed output voltage $Hv_{out}$ is compared to a reference voltage $V_{ref}$ to generate an error signal $v_{err}$. H, in an exemplary embodiment, is a filter. For example, H may be at least one of a low pass filter, a high pass filter, a scale factor, and the like.

In some prior art power converters, tight regulation of the power signals is accomplished through a feedback mechanism comprising a controller 120. Controller 120 may include an analog-to-digital converter 122, a compensator 125, and a modulator 126. Furthermore, controller 120 may be configured to receive the error signal $V_{err}$ and generate one or more logic level control signals c that determine the on/off states of the power semiconductor switches.

Many well-known techniques are available to design and construct controllers. For example, in a constant-frequency pulse-width modulation (PWM) system, the switch control signals have constant frequency equal to the switching frequency, while the signal duty ratio or phase is adjusted to regulate the power signal. Other well-known approaches include current-mode controllers, hysteretic controllers, sliding-mode controllers, controllers based on pulse-frequency modulation, or controllers based on a combination of these techniques. Controllers can be realized using analog, digital or mixed signal circuits.

In general, typical power converters have a conservative design to account for potential changes in power parameters or operating points. Thus, typical prior art power converter systems often do not achieve optimal dynamic performance. Therefore, there is a need for a power converter with improved dynamic performance over a wide range of operating conditions.

SUMMARY

In accordance with an exemplary embodiment, a digital controller includes a comparator, an analog-to-digital converter (ADC), a digital compensator, a monitoring unit, and a digital modulator. The comparator receives an output signal from a power converter, and generates an error signal based at least in part on the difference between the feedback signal and a reference signal. The ADC converts the error signal into a digital form. The digital compensator processes the digital error signal and generates a control signal. Furthermore, the monitoring unit monitors at least one of phase, gain, and frequency of the power converter, and generates a digital feedback signal based on the control signal and an injected signal. The digital modulator receives the digital feedback signal from the monitoring unit, and transmits a control signal to the power converter to adjust the timing of the power converter.

In an exemplary method of regulating a power signal of a power converter, an injection signal is injected into a feedback path in a digital controller of the power converter. A monitoring unit of the digital controller samples at least one feedback signal in the feedback path of the digital controller; and outputs at least one of a measured frequency, a measured phase, and a measured gain associated with a frequency response of the power converter. In an exemplary method, the measured frequency, the measured phase, and the measured gain is based on the injection signal and the at least one feedback signal.

In another exemplary method of stability margin monitoring of a power regulator, a controller generates an error signal based on a comparison of a power signal of a power converter and a reference signal. The controller converts the error signal, using an ADC, to a digital error signal. Further, a digital compensator is used to generate a digital feedback signal based on the error signal. Additionally in an exemplary method, the controller generates a pre-injection signal sample based on sampling the digital feedback signal in a feedback path before injection of an injection signal into the digital feedback signal, and generates a post-injection signal sample based on sampling the digital feedback signal after injection of the injection signal into the feedback path. In an exemplary method, the controller monitors at least one of a measured frequency, a measured gainn, and a measured phase based on a comparison the pre-injection signal sample and the post-injection signal sample.

In another exemplary embodiment, the digital controller also includes an adaptive tuning controller. The adaptive tuning controller uses the monitored phase, gain, and/or frequency measurements to adjust the parameters of the digital compensator. In an exemplary embodiment, the adaptive tuning controller compares the operating measurements with reference values and generates adjusted compensator attributes. In an exemplary embodiment, the monitored phase, gain, and/or frequency correspond to at least one of a phase margin, a gain margin, a crossover frequency, and a gain margin frequency. In accordance with an exemplary embodiment, the monitoring and adjusting of the operating attributes occur continuously.

BRIEF DESCRIPTION OF THE DRAWING

These and other features, aspects and advantages of the present invention may be better understood with reference to the following description, appended claims, and accompanying figures where:

DETAILED DESCRIPTION

While exemplary embodiments are described herein in sufficient detail to enable those skilled in the art to practice the invention, it should be understood that other embodiments may be realized and that logical electrical and system changes may be made without departing from the spirit and scope of the invention. Thus, the following detailed description is presented for purposes of illustration only.

The present invention relates to a power regulation system suitable for providing regulated power to, for example, a microelectronic device such as a microprocessor. In an exemplary embodiment, the regulated power signals include output voltage, output current, input voltage, input current, inductor current and capacitor voltage. In accordance with various exemplary embodiments of the present invention, the power regulation system and method of the present invention are configured to facilitate improved large-signal and small-signal dynamic responses of closed-loop power converter, while preserving precise regulation and small-signal stability margins achieved by standard controllers. In various exemplary embodiments, the power regulation system and method of the present invention are implemented using hardware, software, firmware, or some combination thereof.

In accordance with various exemplary embodiments of the present invention, the system and method comprise added functionality in the form of monitoring of frequency. In another embodiment, phase is monitored. In yet another embodiment, gain is monitored. These monitored attributes can be used to correspond to specific values. For example, the specific values may include phase margin, gain margin, gain margin frequency, and crossover frequency. Although the monitored attributes are described herein as phase margin, gain margin, gain margin frequency, and crossover frequency, in an exemplary embodiment, the monitored attributes may also correspond to at least one of a resonant frequency, a phase around resonance, a gain around resonance, and other similar metrics.

Furthermore, in an exemplary embodiment, the system and method further comprises adaptive tuning of a control loop of the closed-loop power converter. Additionally, in another exemplary embodiment, the system and method further includes mode selection capability.

Continuous Monitoring

Figure 1:
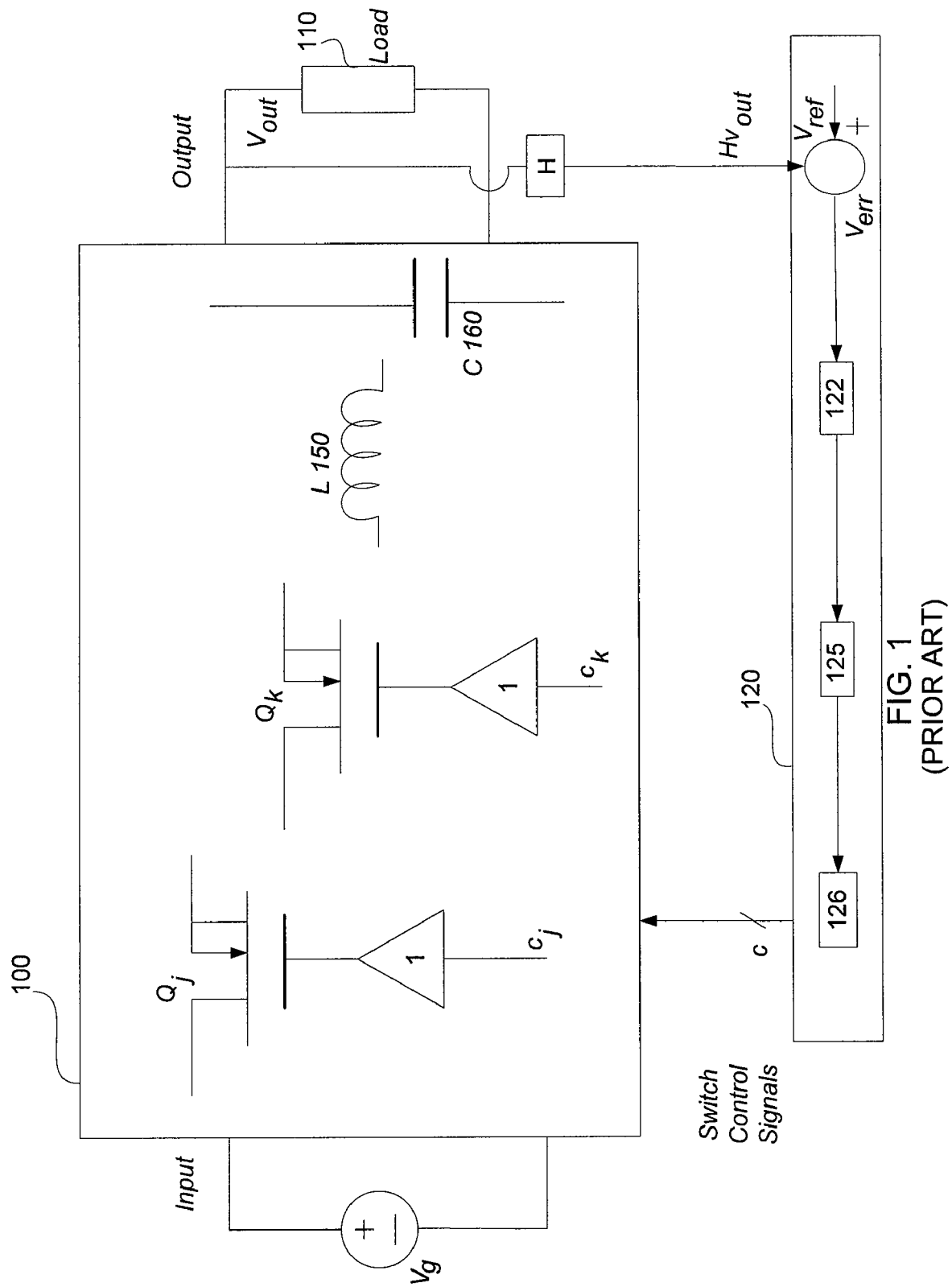
FIG. 1 illustrates a prior art power converter.
Figure 2:
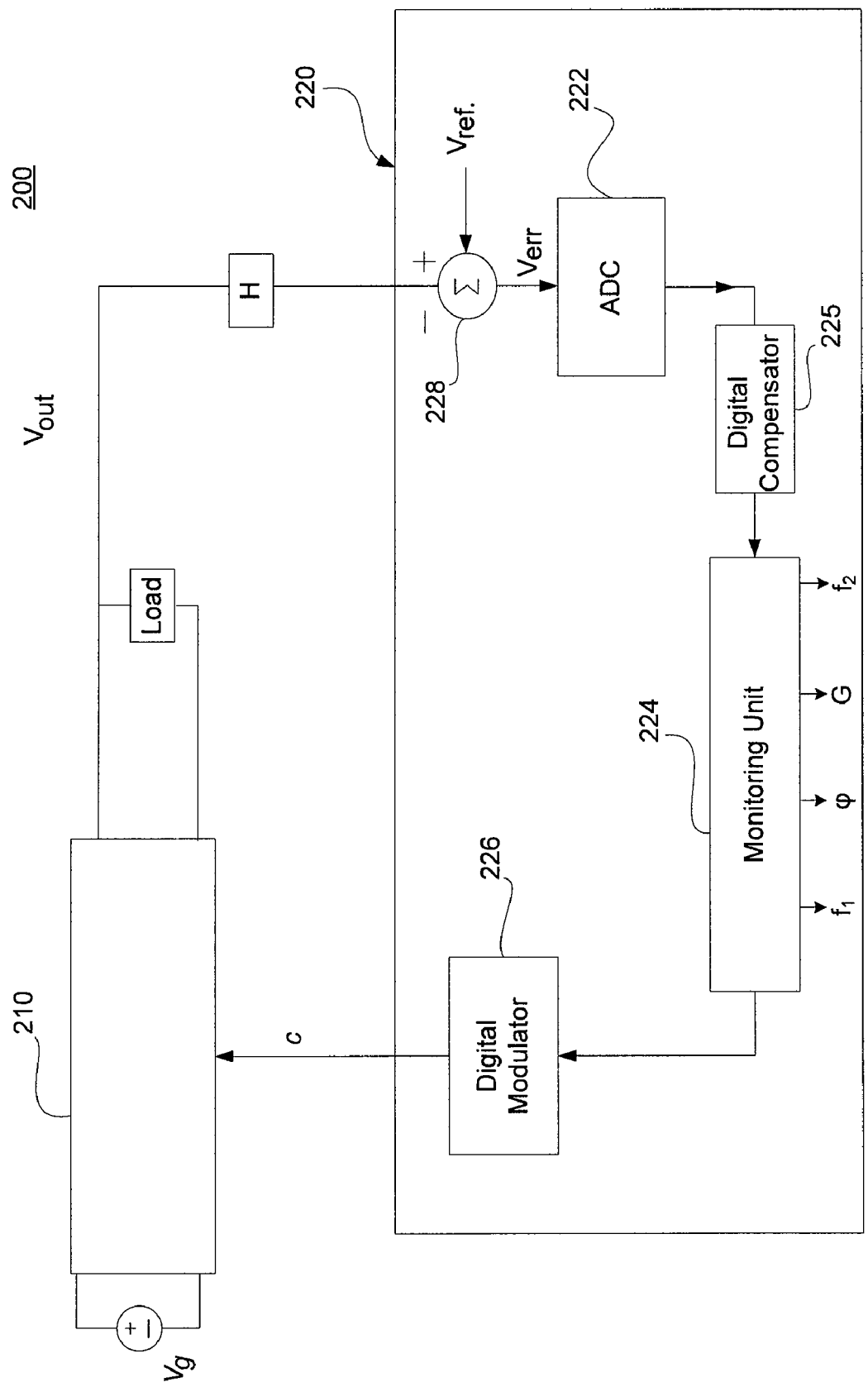
FIG. 2 illustrates, in block format, an exemplary power regulator, including a digital controller.

With reference now to FIG. 2, and in accordance with an exemplary embodiment of the present invention, a power regulator 200 comprises a power converter 210 and a digital controller 220. In an exemplary embodiment, power converter 210 is a switched-mode power supply (SMPS). In another exemplary embodiment, power converter 210 is an inverter. Furthermore, power converter 210 may be any converter suitable for producing a regulated power output.

In an exemplary embodiment, digital controller 220 communicates with the output of power converter 210 and provides a control signal input to power converter 210. For example, digital controller 220 is configured to receive an output signal $V_{out}$ from the output of power converter 210 and to provide a switch control signal c to the control signal input of power converter 210. In an exemplary embodiment, switch control signal c controls the on/off status of switches in power converter 210 and regulates the power output. In a further exemplary embodiment, digital controller 220 is configured to monitor operating attributes of power regulator 200, including at least one of the frequency, phase, and gain of power converter 210. The monitored attributes can be used to correspond to specific values. For example, the monitored attributes may correspond to phase margin, gain margin, gain margin frequency, and crossover frequency.

Furthermore, digital controller 220 can operate in a steady-state environment or in a transient environment. In an exemplary embodiment, the operating attributes are monitored while power converter 210 is in regulation. In other words, the monitoring can occur without interrupting the normal operation of power converter 210. In another exemplary embodiment, the monitoring of operating attributes may be continuous and occur at any time power converter 210 is operating. In yet another exemplary embodiment, the monitoring of operating attributes may be discontinuous. Discontinuous monitoring includes periodic monitoring, intermittent monitoring, or anything less than continuous monitoring. The monitoring is not limited to the start-up of power converter 210 as with some typical systems. For further detail on digital controller 220, review "An Online Phase Margin Monitor for Digitally Controlled Switched-Mode Power Supplies", written by Jeff Morroni, Regan Zane, and Dragan Maksimovic, which is hereby incorporated by reference.

In accordance with an exemplary embodiment of the present invention, power converter 210 comprises one or more switches, inductors, capacitors, and/or transformers. The switches may, for example, be implemented as power semiconductor devices operated as switches controlled by logic-level on/off signals c. The inductor(s) and capacitor(s) may, for example, be configured as filters. Various types of power converters are known and may be used in exemplary embodiments of the invention. For example, power converter 210 may comprise a DC-DC power converter. In accordance with various aspects of the invention, power converter 210 may comprise a synchronous buck converter, a buck converter with a diode rectifier, a boost converter, an isolated half-bridge, full-bridge, push-pull or phase-shifted converter, a Cuk converter, and/or the like.

Furthermore, in accordance with an exemplary embodiment of the present invention, and with continued reference to FIG. 2, digital controller 220 comprises an analog-to-digital converter (ADC) 222, a closed-loop monitoring unit 224, a digital compensator 225, a digital modulator 226, and a comparator 228. The output of comparator 228 communicates with the input of ADC 222, and the output of ADC 222 communicates with the input of digital compensator 225. Furthermore, the output of digital compensator 225 communicates with monitoring unit 224, which in turn communicates with digital modulator 226. In an exemplary embodiment, a feedback path from the output of ADC 222 to digital modulator 226 is implemented on a FPGA. Furthermore, the feedback path may be implemented using hardware, software, or some combination thereof.

In an exemplary embodiment, comparator 228 comprises a voltage comparator or a differential amplifier. Furthermore, comparator 228 may comprise any standard comparator. For example, comparator 228 may be any device configured to receive an output signal from the output of power converter 210, receive a reference signal, and output an error signal representing the difference between the output signal and the reference signal.

Furthermore, in an exemplary embodiment, digital modulator 226 comprises at least one of a pulse-width modulator (PWM), a pulse-frequency modulator (PFM), a frequency modulator, or a phase-shifted modulator. A PWM uses a modulation scheme in which the switching period remains constant while the modulator on-time is varied within the switching period. The term duty cycle, defined as the on-time over the switching period, can also be used to describe PWM operation. Conversely, pulse-frequency modulation is configured such that the on-time remains fixed while the switching period is varied. In an exemplary embodiment, frequency modulators vary both the switching period and the on-time to maintain a constant duty cycle. Furthermore, phase-shifted modulators may contain any number of the previously described modulators operating in parallel and phase shifted with respect to each other.

In one exemplary embodiment the received power signal is the output voltage $V_{out}$ at the output of power converter 210. Furthermore, the received reference signal may be a reference voltage $V_{ref}$. In an exemplary embodiment, the error signal may be the voltage error signal $V_{err}$, representing the difference between $V_{out}$ and $V_{ref}$. In accordance with other exemplary embodiments, the received power signal from power converter 210 may comprise an output current, an inductor current, a converter input voltage, a converter input current, or a converter capacitor voltage. Thus, comparator 228 may be any suitable comparator configured to compare the received power signal with a suitable reference signal to generate an error signal.

Figure 3A:
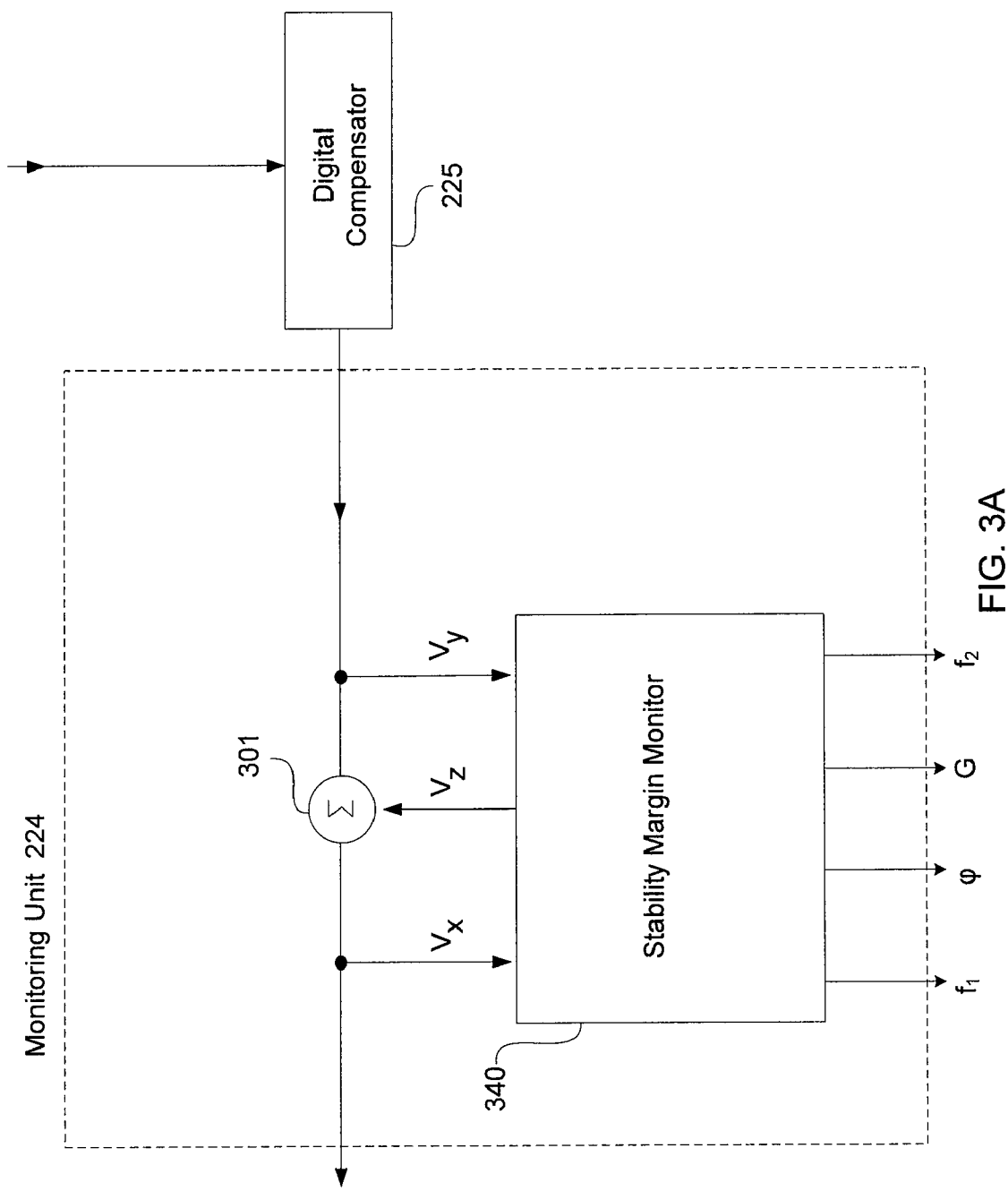
FIG. 3A illustrates, in block format, an exemplary monitoring unit of a power regulator.
Figure 3B:
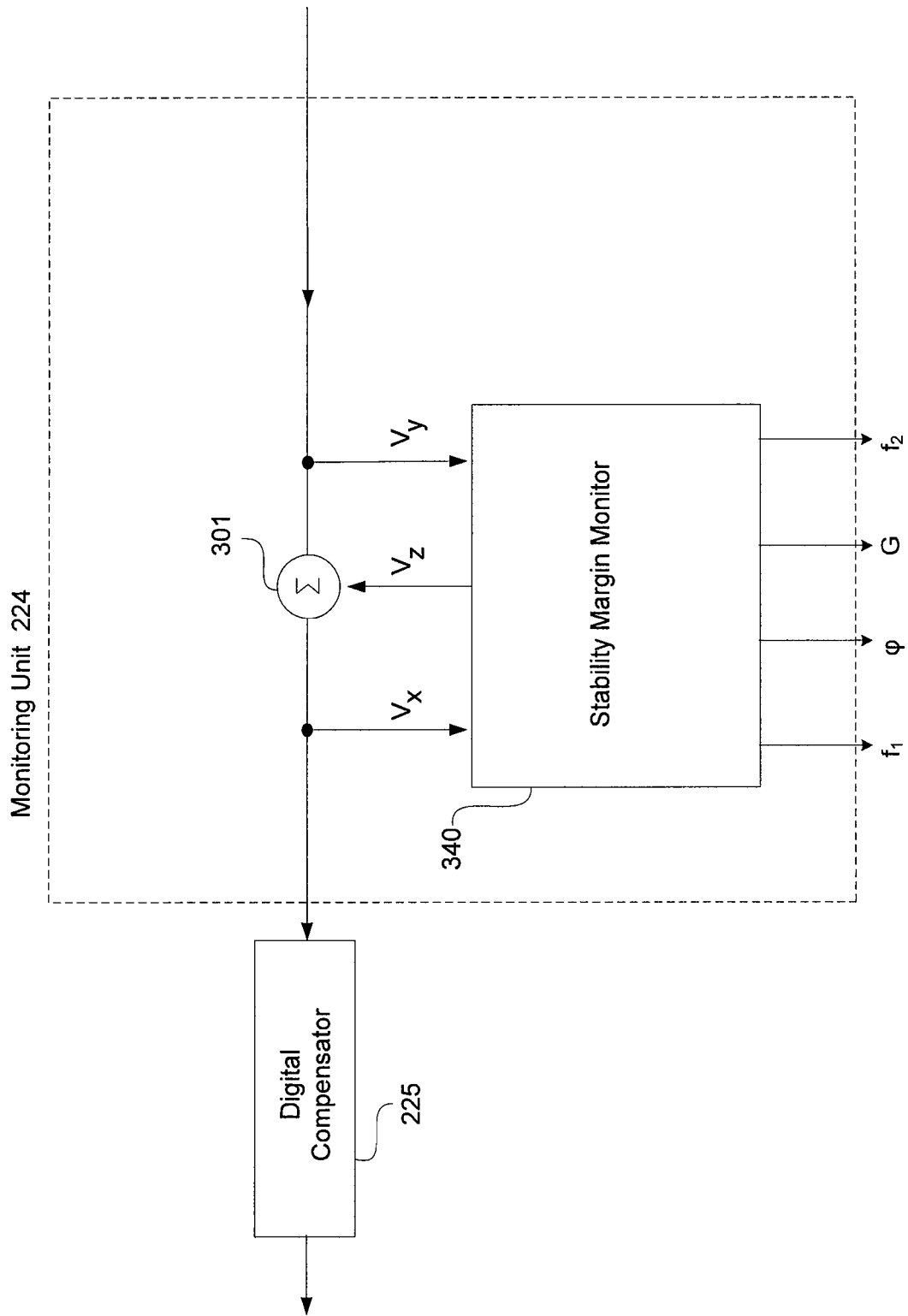
FIG. 3B illustrates, in block format, another exemplary monitoring unit of a power regulator.
Figure 3C:
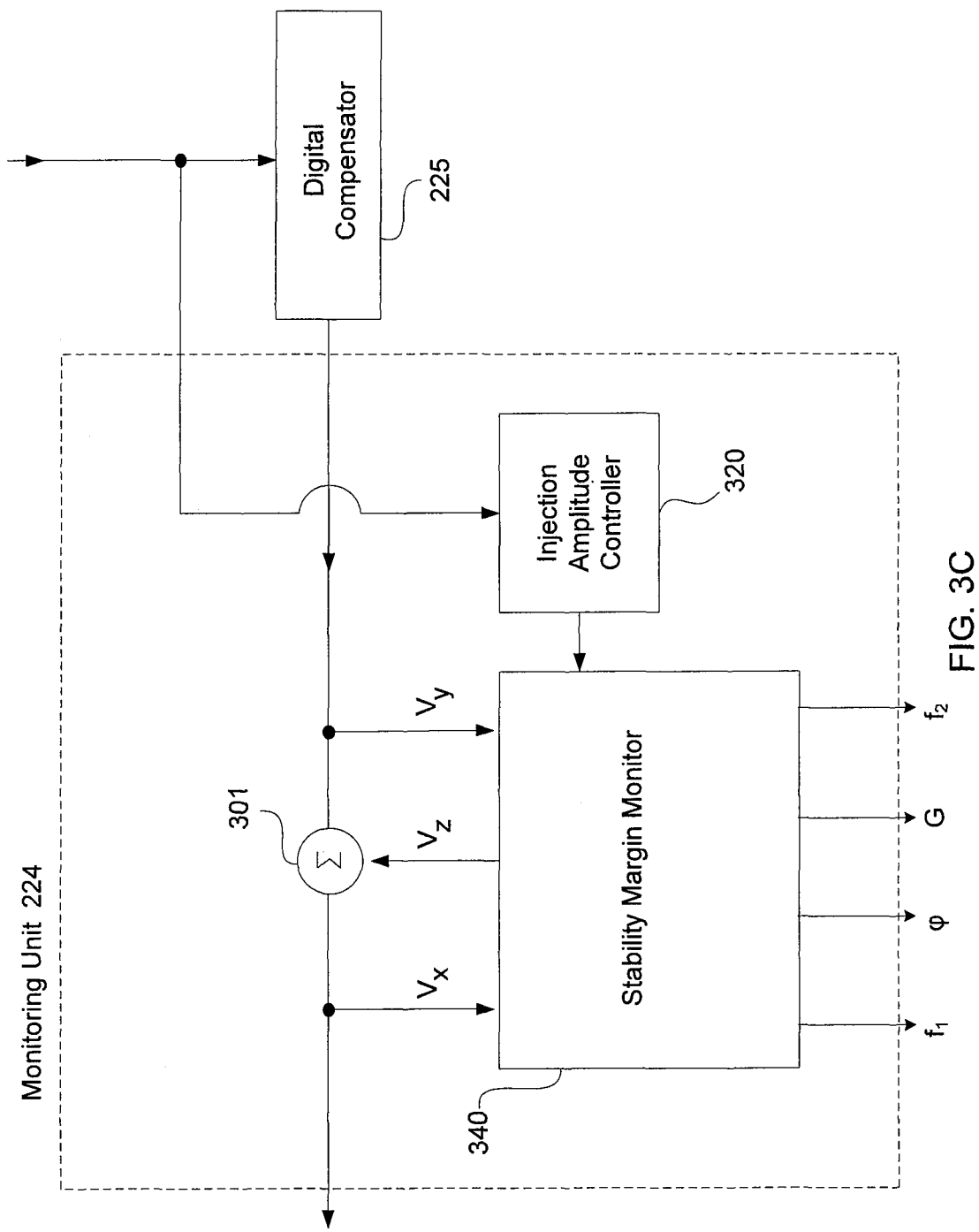
FIG. 3C illustrates, in block format, an exemplary monitoring unit of a power regulator comprising an amplitude controller.

With reference to FIG. 3A, monitoring unit 224 receives a digital feedback signal from ADC 222, via digital compensator 225, and outputs the digital feedback signal to digital modulator 226. In another exemplary embodiment and with reference to FIG. 3B, monitoring unit 224 receives a digital feedback signal from ADC 222, and outputs the digital feedback signal to digital modulator 226, via digital compensator 225. In an exemplary embodiment, monitoring unit 224 comprises a stability margin monitor 340. In another exemplary embodiment and with reference to FIG. 3C, monitoring unit 224 further comprises an injection amplitude controller 320. In accordance with an exemplary embodiment, injection amplitude controller 320 receives the digital feedback signal from the input to digital compensator 225 and outputs a signal which adjusts the amplitude of injection signal Vz. In an exemplary embodiment, the output signal is based on the peaks of the digital error signal from ADC 222. In accordance with another exemplary embodiment, injection amplitude controller 320 senses the digital feedback signal at any portion of the feedback signal in digital controller 220. For example, injection amplitude controller 320 may sense the feedback signal before or after ADC 222, or before or after digital compensator 225.

Monitoring unit 224 is configured to add an injection signal Vz to the digital feedback signal and measure various operating attributes. In an exemplary embodiment, stability margin monitor 340 outputs at least one of a phase signal and a frequency signal. In another embodiment, stability margin monitor 340 further outputs a gain signal. In accordance with an exemplary embodiment, stability margin monitor 340 may be used as an online design aid, and/or for diagnostics and health monitoring capabilities for a digitally controlled power converter. In another embodiment, stability margin monitor 340 is part of an adaptive tuning system.

Furthermore, in one embodiment, the injection signal Vz is added to the input signal of digital compensator 225. In another embodiment, the injection signal Vz is added to the output signal of digital compensator 225. Moreover, the injection signal Vz may be injected into the digital feedback signal at any point in the feedback path.

In accordance with an exemplary embodiment, monitoring unit 224 injects the injection signal Vz in the digital feedback signal via a summer 301 while monitoring the feedback path both before (Vy) and after (Vx) the point of injection signal Vz. To describe another way, Vy is a measurement of a digital feedback signal taken at the output of digital compensator 225. Vx is a measurement of a digital feedback signal taken at the input of digital modulator 226. Moreover, in an exemplary embodiment, Vz is injected between Vy and Vx, such that digital compensator 225 output is substantially similar, but not equal to, the input of digital modulator 226.

Though the embodiment described herein so far refer to monitoring the feedback path before and after the injection of injection signal Vz, it is also possible to derive at least one of the monitored signals Vx or Vy based on Vz and the other monitored signal. In accordance with an exemplary embodiment, monitoring unit 224 injects the injection signal Vz in a digital feedback signal via a summer 301 while monitoring the digital feedback signal only prior (Vy) to the point of injection signal Vz. The value of feedback signal at Vx is derived from Vy and Vz. In another exemplary embodiment, monitoring unit 224 injects the injection signal Vz in the digital feedback signal via a summer 301 while monitoring a digital feedback signal only after (Vx) the point of injection signal Vz. The value of the feedback signal at Vy is derived from Vx and Vz. The monitoring of feedback signal will generally be described as monitoring before and after the injection of the injection signal Vz, however the scope of this application is intended to cover deriving either Vy or Vx.

In accordance with an exemplary embodiment, the measured operating attributes are based in part on a comparison of Vy and Vx. Furthermore, in one embodiment, the injection signal Vz is based in part on the comparison of Vy and Vx as well. In another embodiment, the injection signal Vz is also based in part on the output from injection amplitude controller 320. Injection signal Vz may be based on the various attributes of Vy, Vx, and/or injection amplitude controller 320 output, such as the phase, amplitude, frequency, or any combination thereof.

In an exemplary embodiment, the injection signal Vz is small in comparison to a digital feedback signal in the feedback path and causes only a small perturbation of Vout when injected. In another exemplary embodiment, the injection signal Vz is large in comparison to the digital feedback signal in the feedback path but causes only a small perturbation of Vout. Thus, monitoring unit 224 is configured to have a minimal impact on the output of the power converter. In an exemplary embodiment, the injection signal Vz amplitude achieves a minimum detectable +/−1 least significant bit (LSB) output signal perturbation, which minimizes the impact of the injection signal Vz on the output voltage ripple.

Figure 6:
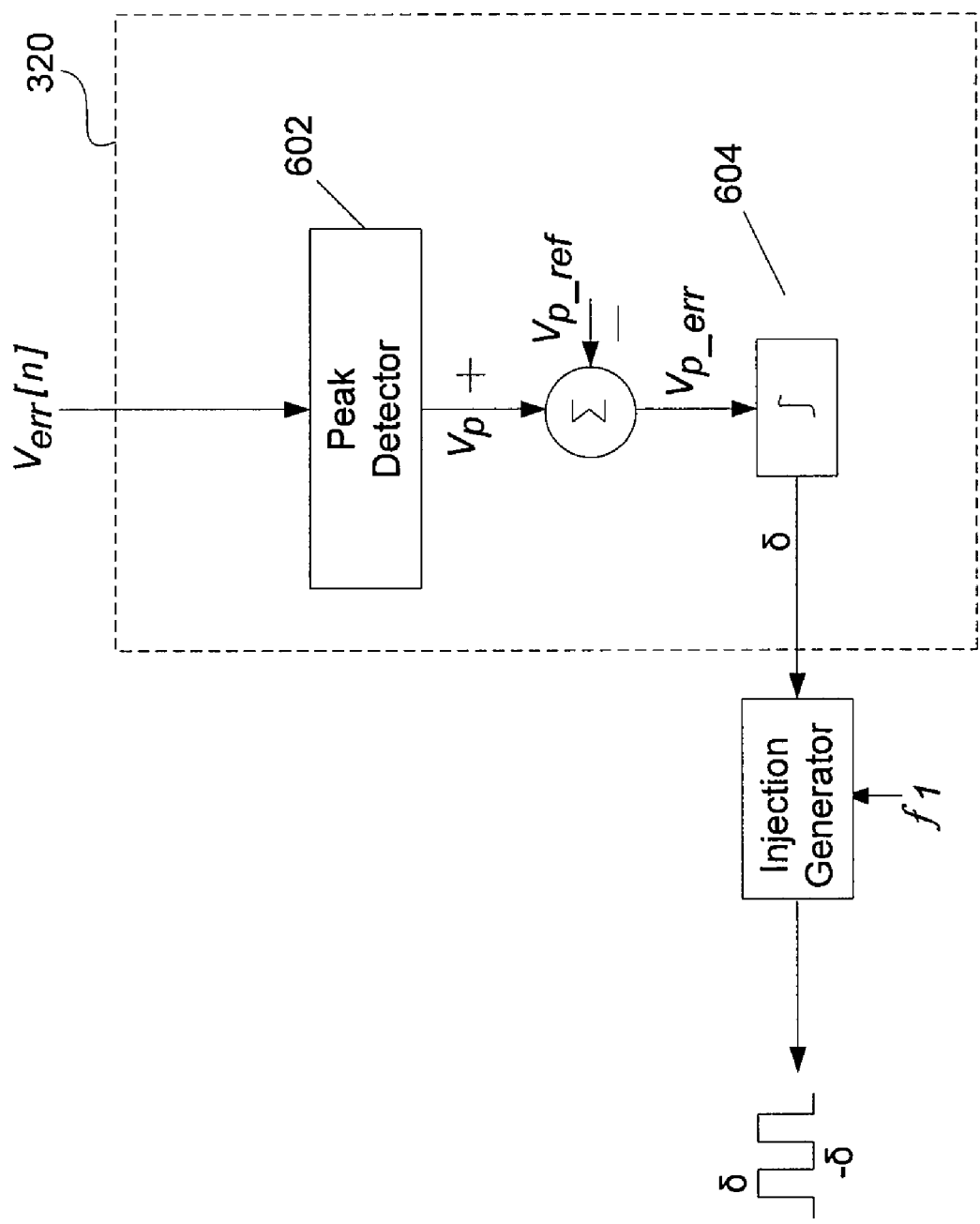
FIG. 6 illustrates an exemplary injection amplitude controller.

In an exemplary embodiment, and with reference to FIG. 6, injection amplitude controller 320 comprises a peak detector 602 and an integral compensator 604. Moreover, injection amplitude controller 320 may comprise any suitable configuration for controlling a signal's amplitude based on a sensed feedback signal, such as $V_{err}$. In an exemplary embodiment, injection amplitude controller 320 receives a quantized output voltage error $V_{err}$ and passes it through peak detector 602. Integral compensator 604 compares the peak detector output voltage error $V_p$ with a desired magnitude of injection signal $V_{p\_ref}$ and outputs a voltage magnitude error signal $V_{p\_err}$. In an exemplary embodiment, the injection signal Vz amplitude is adjusted using an integral compensator until the injection signal Vz reaches, or substantially reaches, the desired output signal perturbation. In an exemplary embodiment, the injection signal Vz amplitude achieves a minimum detectable +/−1 least significant bit (LSB) perturbation in output signal Vout, which minimizes the impact of the injection signal Vz on the output voltage ripple. Furthermore, in an exemplary embodiment injection amplitude controller 320 maintains +/−1 LSB perturbation despite changes in the frequency of the injection signal Vz. Moreover, the amplitude of the injection signal Vz may be set to cause a detectable voltage ripple of any desired number of LSB's of the output voltage Vout. In another exemplary embodiment, the amplitude of the injection signal Vz causes a detectable voltage ripple of +/−1 LSB of a feedback signal in the feedback path.

Figure 4:
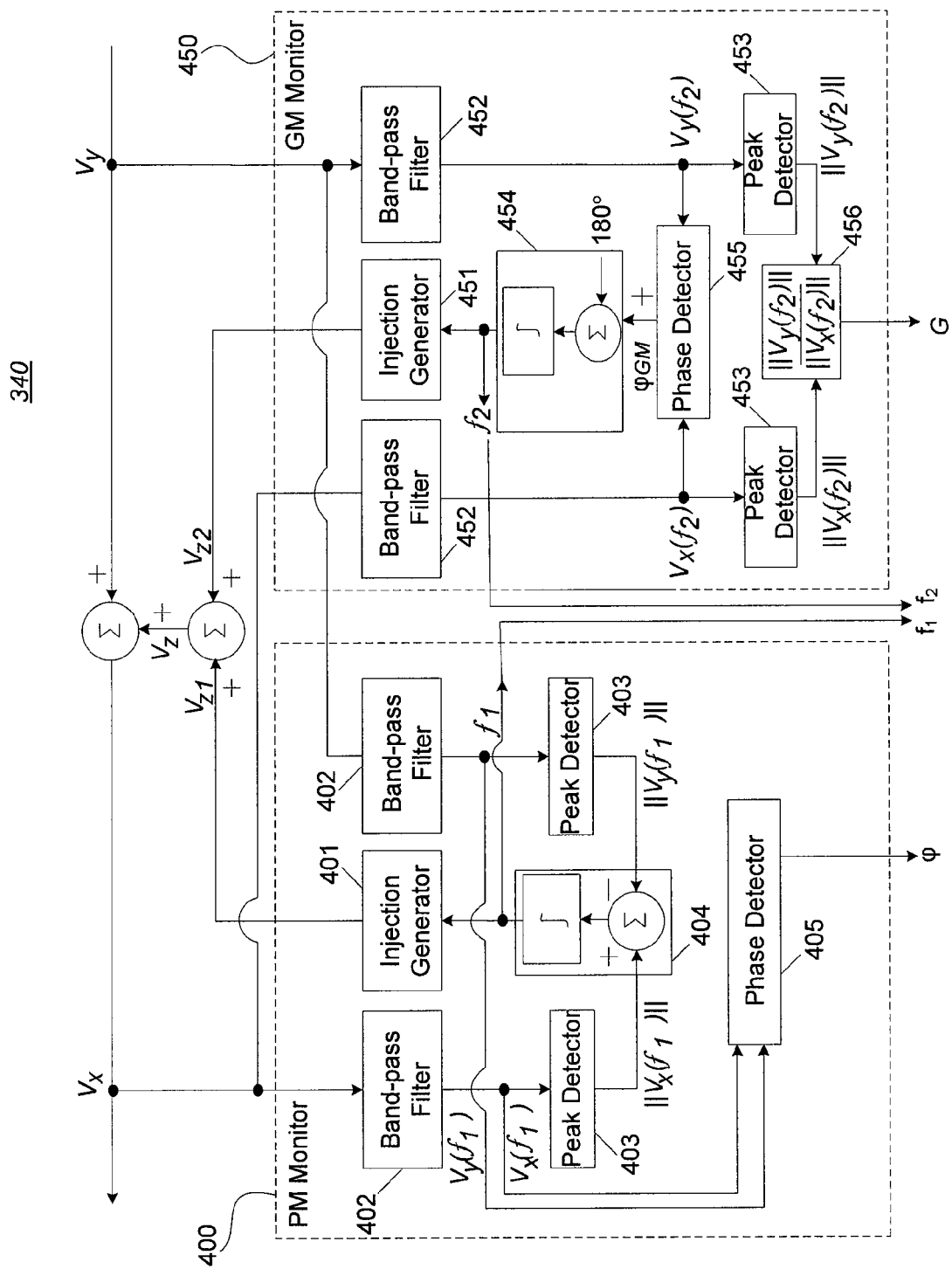
FIG. 4 illustrates, in block format, another exemplary monitoring unit of a power regulator.

In accordance with an exemplary embodiment for monitoring and measuring stability margins, and with reference to FIG. 4, stability margin monitor 340 comprises a phase margin monitor 400. Phase margin monitor 400 may comprise an injection generator 401, two band-pass filters 402, two peak detectors 403, an integral compensator 404, and a phase detector 405. Moreover, phase margin monitor 400 may comprise any suitable component assembly configured to monitor phase and/or frequency for comparison to phase margin and/or crossover frequency respectively, as would be known to one skilled in the art. In an exemplary embodiment, phase margin monitor 400 outputs a first injection signal $Vz_1$, which is a square-wave signal with fundamental frequency $f_1$.

In one exemplary embodiment, phase margin monitor 400 comprises band pass filters 402. In one embodiment, band pass filters 402 are second order digital filters with passband equal to injection signal frequency. Moreover, band pass filters 402 may be any suitable band pass filter as would be known to one skilled in the art. In an exemplary embodiment, band pass filters 402 are high Q-factor filters with the pass band approximately centered at the injection signal frequency. Thus, band pass filters 402 are adjustable to maintain the approximate desired filter center. In an exemplary embodiment, band pass filters 402 are used to reduce the affects of using a square-wave injection signal, such as removing all, or substantially all, unwanted frequency components of the feedback signal.

Furthermore, in accordance with an exemplary embodiment, integral compensator 404 is configured to receive two peak detector values. For example, the first peak detector value $\|Vx(f_1)\|$ represents a point in the digital feedback signal that is after the injection signal Vz is added. In a further example, the second peak detector value $\|Vy(f_1)\|$ represents a point in the digital feedback signal that is before the injection signal Vz is added. These two peak detector values $\|Vx(f_1)\|$, $\|Vy(f_1)\|$ are compared to find the error between them. Integral compensator 404 is configured to output the injection frequency signal $f_1$. In an exemplary embodiment, the injection frequency signal $f_1$ is adjusted such that there is no error, or reduced error, between the two peak detector values, resulting in the crossover frequency being equal, or approximately equal, to the injection frequency signal $f_1$.

The injection generator 401 may receive a signal from integral compensator 404. In accordance with an exemplary embodiment, injection generator 401 comprises a counter and a comparator. In an exemplary embodiment, injection generator 401 receives as input a frequency signal and uses a high frequency clock to count up to the count value of the frequency signal. In an exemplary embodiment, a square wave signal is generated at a desired injection frequency using the counter and the count value of the frequency signal. Injection generator 401 output is high when a counter value is below the count value. Injection generator 401 output is low when the counter value is greater than the count value. In another exemplary embodiment, injection generator 401 output is low when a counter value is below the count value, and high when the count value is greater than the count value.

In an exemplary embodiment, injection generator 401 creates a 50% duty cycle, square-wave perturbation which is frequency adjusted by a frequency signal provided by integral compensator 404. In one embodiment, the square-wave signal is generated using a system clock and a comparator.

Figure 5:
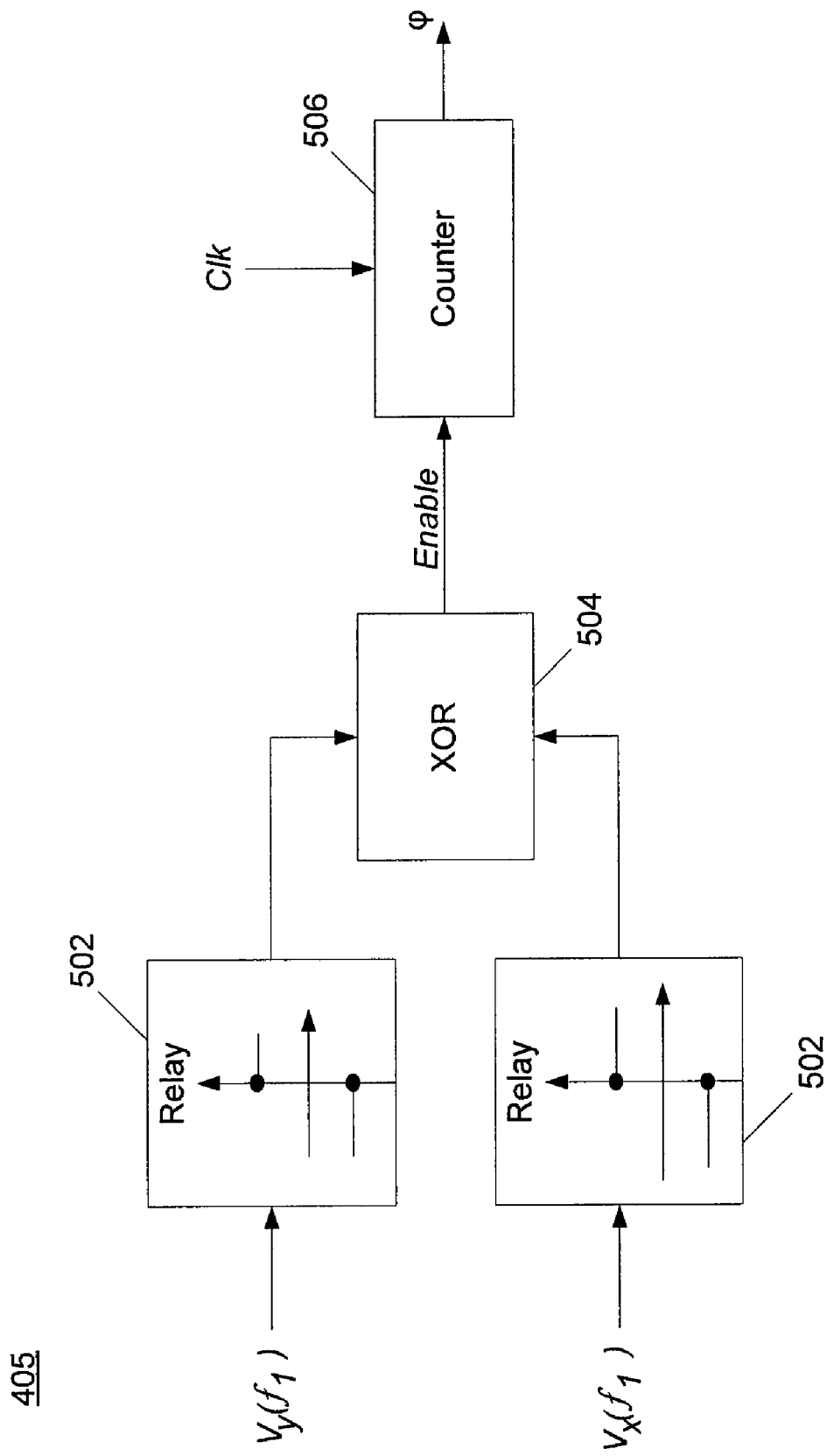
FIG. 5 illustrates an exemplary phase detector.

In another exemplary embodiment, the phase monitoring and measuring also includes phase detection. In an exemplary embodiment, phase margin monitor 400 comprises a phase detector 405. In one embodiment, and with reference to FIG. 5, phase detector 405 comprises two digital relays 502 and an XOR gate 504 that generates an enable pulse, providing a direct relationship between the phases of the two input signals. In another embodiment, phase detector 405 may also include a counter 506 that measures the duration of the enable pulse at different levels. Moreover, phase detector 405 may comprise any suitable configuration as would be known to one skilled in the art. The phase detector 405 is configured to receive two input signals and output a signal representing the phase difference between the two input signals.

In addition to phase and frequency, gain of power converter 210 may also be monitored. In an exemplary embodiment for monitoring and measuring gain, and with reference to FIG. 4, stability margin monitor 340 comprises a gain margin monitor 450. In an exemplary embodiment, gain margin monitor 450 comprises an injection generator 451, two band-pass filters 452, two peak detectors 453, an integral comparator 454, a phase detector 455, and a magnitude calculator 456. Moreover, gain margin monitor 450 may comprise any suitable component assembly configured to monitor gain as would be known to one skilled in the art.

Similar to phase margin monitor 400, gain margin monitor 450 receives input signals Vy and Vx. In an exemplary embodiment, gain margin monitor 450 outputs a second injection signal $Vz_2$, which is a square-wave signal with fundamental frequency $f_2$. Furthermore, an injection signal may be a sinusoidal signal, or any variable frequency signal. In an exemplary embodiment, frequency $f_2$ is adjusted until the phase shift between $Vx(f_2)$ and $Vy(f_2)$ is equal to, or substantially equal to, 180°. The frequency $f_2$ is adjusted using feedback and integral compensator 454. When $f_2$ becomes equal, or substantially equal, to 180° phase shift, the frequency may be referred to as $f_{180}$ or gain margin frequency. A 180° phase shift provides an assessment of the gain by comparing the ratio of the peak value of $Vy(f_2)$ and the peak value of $Vx(f_2)$. For further detail, review "Integration of Gain Margin Monitoring and Control into Adaptive Tuning System", written by Jeff Morroni, Regan Zane, and Dragan Maksimovic, which is hereby incorporated by reference.

In accordance with an exemplary embodiment, the second injection signal $Vz_2$ is combined with the first injection signal $Vz_1$ to form injection signal Vz. The injection of injection signals $Vz_1$ and $Vz_2$ can occur either separately or simultaneously. In another embodiment, band-pass filters are used to sufficiently filter out injection signal $Vz_1$ from $Vx(f_2)$ and $Vy(f_2)$. Similarly, band-pass filters 402 are used to sufficiently filter out injection signal $Vz_2$ from $Vx(f_1)$ and $Vy(f_1)$.

Furthermore, in one exemplary embodiment and with momentary reference to FIG. 2, power regulator 200 has improved DC regulation. The DC value of the output voltage is near or at the center of the zero error bin with resolution corresponding to digital modulator 226 through a combination of periodic oscillation and digital compensator 225. The zero error bin is the range of analog errors input to ADC 222 over which ADC 222 measures the error as being zero due to ADC 222 having finite resolution.

Adaptive Tuning

In an exemplary embodiment, an adaptive tuning controller compares the measured operating attributes provided by the controller with reference values and generates adjusted operating attributes. In an exemplary embodiment, the adaptive tuning controller is capable of influencing the power output of the power converter to adjust to transient events. In an exemplary embodiment, the measured operating attributes, which include phase, gain, and frequency, correspond to at least one of a phase margin, a gain margin, a crossover frequency, and a gain margin frequency.

With reference to FIG. 4, crossover frequency is defined as the injection frequency $f_1$ at which the magnitudes of $V_x(f_1)$ and $V_y(f_1)$ are equal. Further, when $f_1$ is such that the magnitudes of $V_x(f_1)$ and $V_y(f_1)$ are equal, the phase margin is defined as the phase shift between signals $V_y(f_1)$ and $V_x(f_1)$. With further reference to FIG. 4, gain margin is defined as the ratio of the magnitudes of $V_x(f_2)$ and $V_y(f_2)$ while the injection frequency, $f_2$ is such that there is a 180° phase shift between $V_x(f_2)$ and $V_y(f_2)$. Further, the gain margin frequency $f_{180}$ is defined as the injection frequency $f_2$ at which there is a 180° phase shift between $V_x(f_2)$ and $V_y(f_2)$.

Figure 7A:
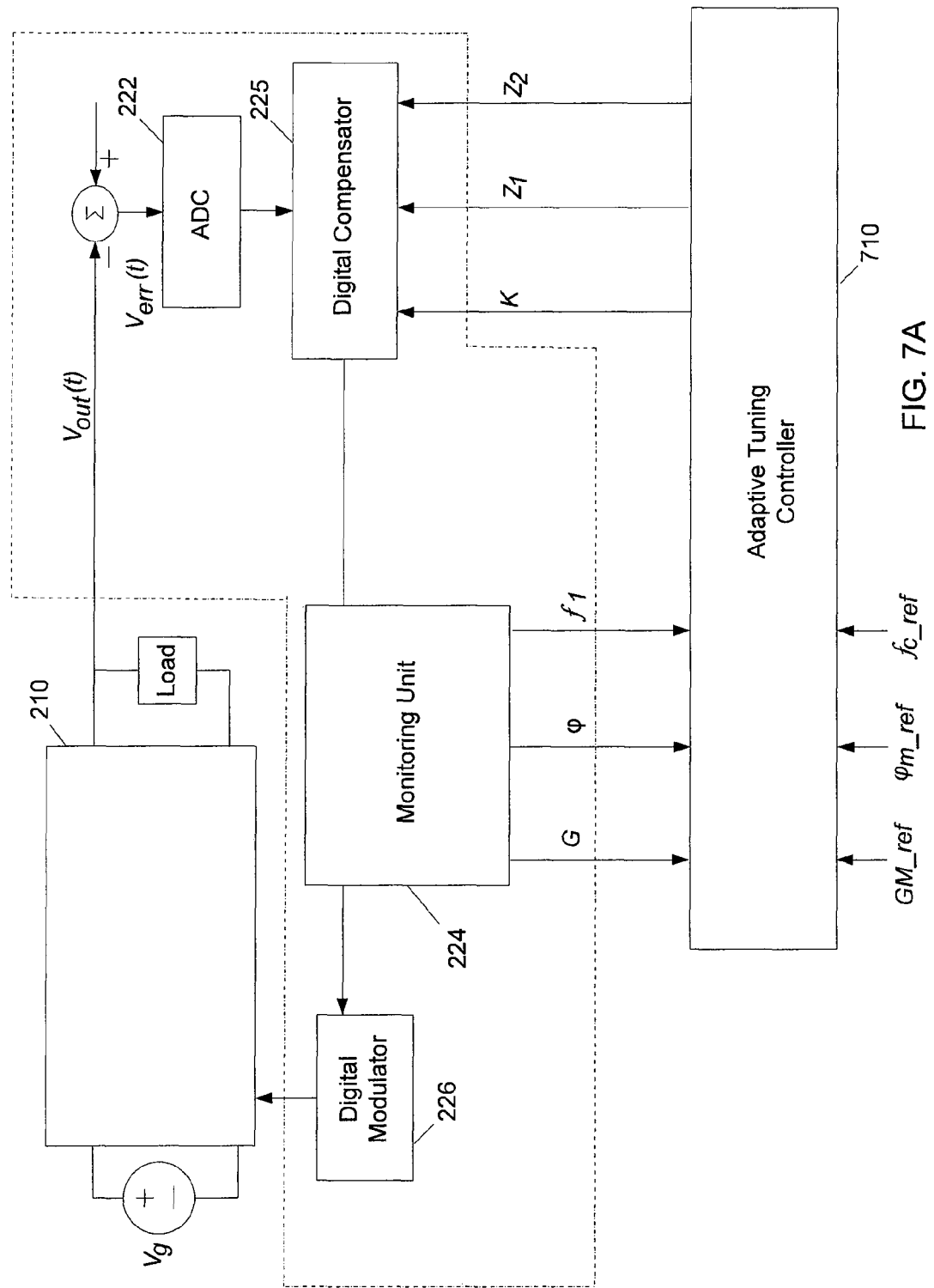
FIGS. 7A and 7B illustrate exemplary embodiments of an adaptive tuning system in communication with a digital controller.

In accordance with an exemplary embodiment, and with reference to FIG. 7A, a digital controller comprises an adaptive tuning controller 710 using a multi-input multi-output (MIMO) control loop. In other exemplary embodiments, adaptive tuning controller 710 may use a single-input multi-output control loop or a multi-input single-output control loop. In an exemplary embodiment, adaptive tuning controller 710 receives as input at least one of injection frequency $f_1$, phase φ, gain G, and injection frequency $f_2$ (not shown). The input may be provided, for example, from monitoring unit 224. However, other systems and methods for providing the input may be used.

Figure 7B:
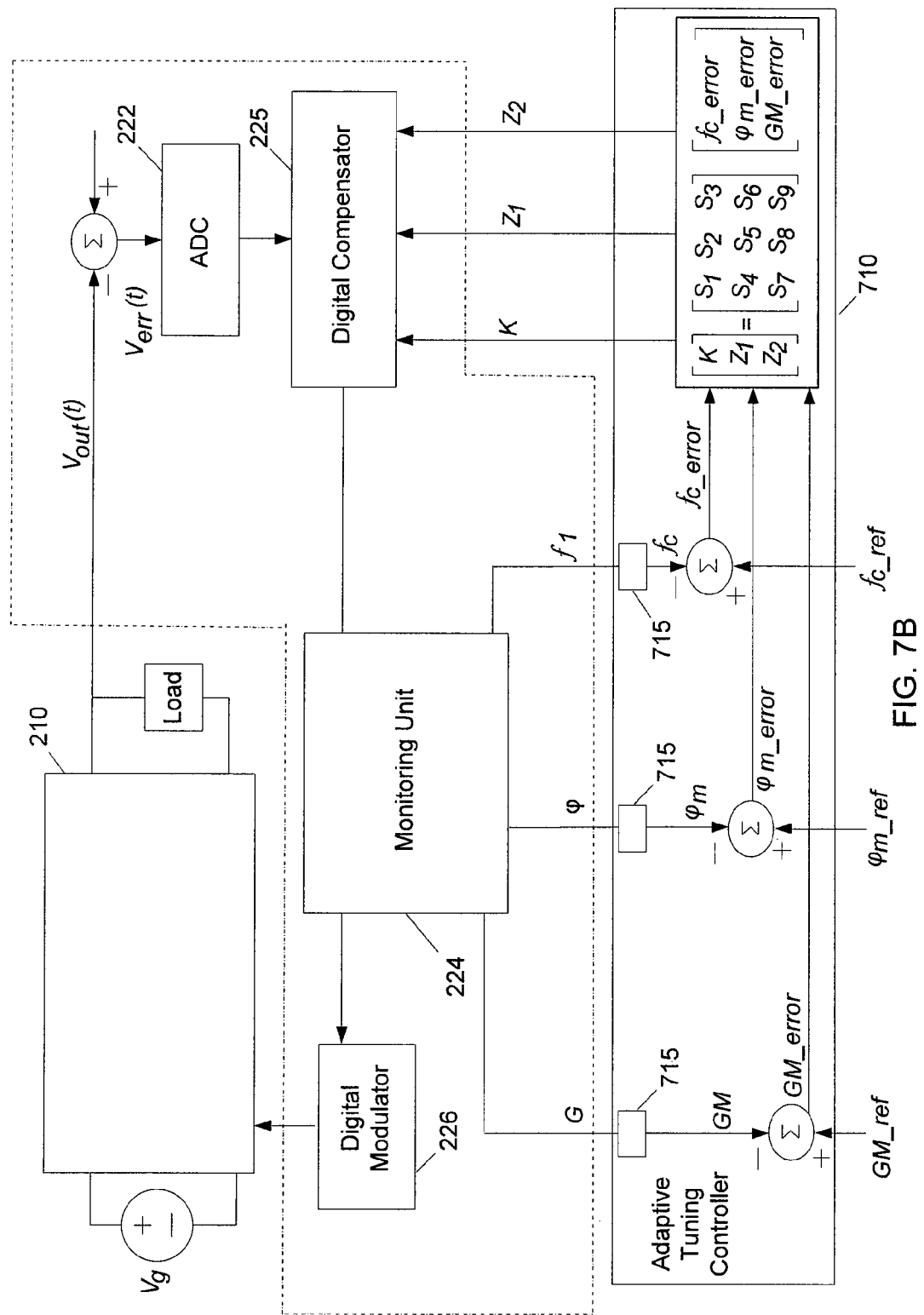

In an exemplary embodiment and with reference to FIG. 7B, adaptive tuning controller 710 further comprises samplers 715. Samplers 715 sample at least one of injection frequency $f_1$, phase φ, gain G, and gain margin frequency $f_2$ (not shown). In an exemplary embodiment, the sampling rate of samplers 715 is such that the outputs of monitoring unit 224 have sufficiently settled to their steady-state values. In an exemplary embodiment, these steady-state values correspond to crossover frequency $f_c$, phase margin $φ_m$, gain margin GM, and gain margin frequency $f_{180}$.

Adaptive tuning controller 710 also receives at least one of a gain margin reference signal $GM\_{ref}$, a phase margin reference signal $φ_{m\_ref}$, a crossover frequency reference signal $f_{c\_ref}$, a gain margin frequency reference signal $f_{180\_ref}$ (not shown). In accordance with an exemplary embodiment and with continued reference to FIG. 7B, an input is compared to the related reference signal. The comparison generates an error signal, such as a cross-over frequency error signal $f_{c\_error}$, a phase margin error signal $φ_{m\_error}$, a gain margin frequency error signal $f_{180\_error}$ (not shown), and a gain margin error signal $GM\_{error}$.

In an exemplary embodiment, adaptive tuning controller 710 tunes at least one of the parameters of digital compensator 225 until measured crossover frequency and/or phase margin targets equal, or substantially equal, desired values. In another embodiment, adaptive tuning controller 710 continuously tunes digital compensator 225 parameters. In yet another exemplary embodiment, adaptive tuning controller 710 can function while power converter 210 is in non-steady state conditions. In one embodiment, the output voltage disturbance is less than 1% of the output voltage DC regulation level. For example, a DC regulation voltage of 5V with a tolerance of 1% results in 50 mV or less of output voltage disturbance. In another embodiment, the output voltage disturbance may also be in the range of 0-5% of the output voltage DC regulation.

The measured stability margins provided by monitoring unit 224 may be compared to reference values to determine an error value. In an exemplary embodiment, the outputs of monitoring unit 224 are at least one of the phase margin $φ_m$, gain margin GM, gain margin frequency $f_{180}$, and crossover frequency $f_c$. The output signals are then compared to reference values, $φ_{m\_ref}$, $GM\_{ref}$, $f_{180\_ref}$, and $f_{c\_ref}$, respectively. The comparison determines the system's crossover frequency error signal $f_{c\_error}$, gain margin error signal $GM\_{error}$, gain margin frequency error signal $f_{180\_error}$, and a phase margin error signal $φ_{m\_error}$, which are the inputs into the adaptive controller.

Using a series of equations, such as those described by MIMO compensator S(z) of adaptive tuning controller 710, one or more of the parameters of digital compensator 225 are adjusted until reference values $φ_{m\_ref}$, $GM\_{ref}$, $f_{180\_ref}$, and $f_{c\_ref}$ match, or substantially match, measured stability margins $φ_m$, GM, $f_{180}$ and $f_c$. For additional details, review "Adaptive Tuning of Digitally Controlled Switched Mode Power Supplies Based on Desired Phase Margin", written by Jeff Morroni, Regan Zane, and Dragan Maksimovic, which is hereby incorporated by reference.

An advantage of implementing adaptive tuning is the ability to maintain stability margins despite wide variations in system parameters. In another exemplary embodiment, the adaptive tuning system is configured to maintain, as approximately constant, the dynamic performance of the system (e.g., rise time, settle time, over shoot). In yet another exemplary embodiment, the adaptive tuning system is configured to respond better to disturbances and transients than a typical power converter. The adaptive tuning system can automatically adjust quicker than prior art systems, resulting in less conservative margins in the system.

Mode Selection

Figure 8:
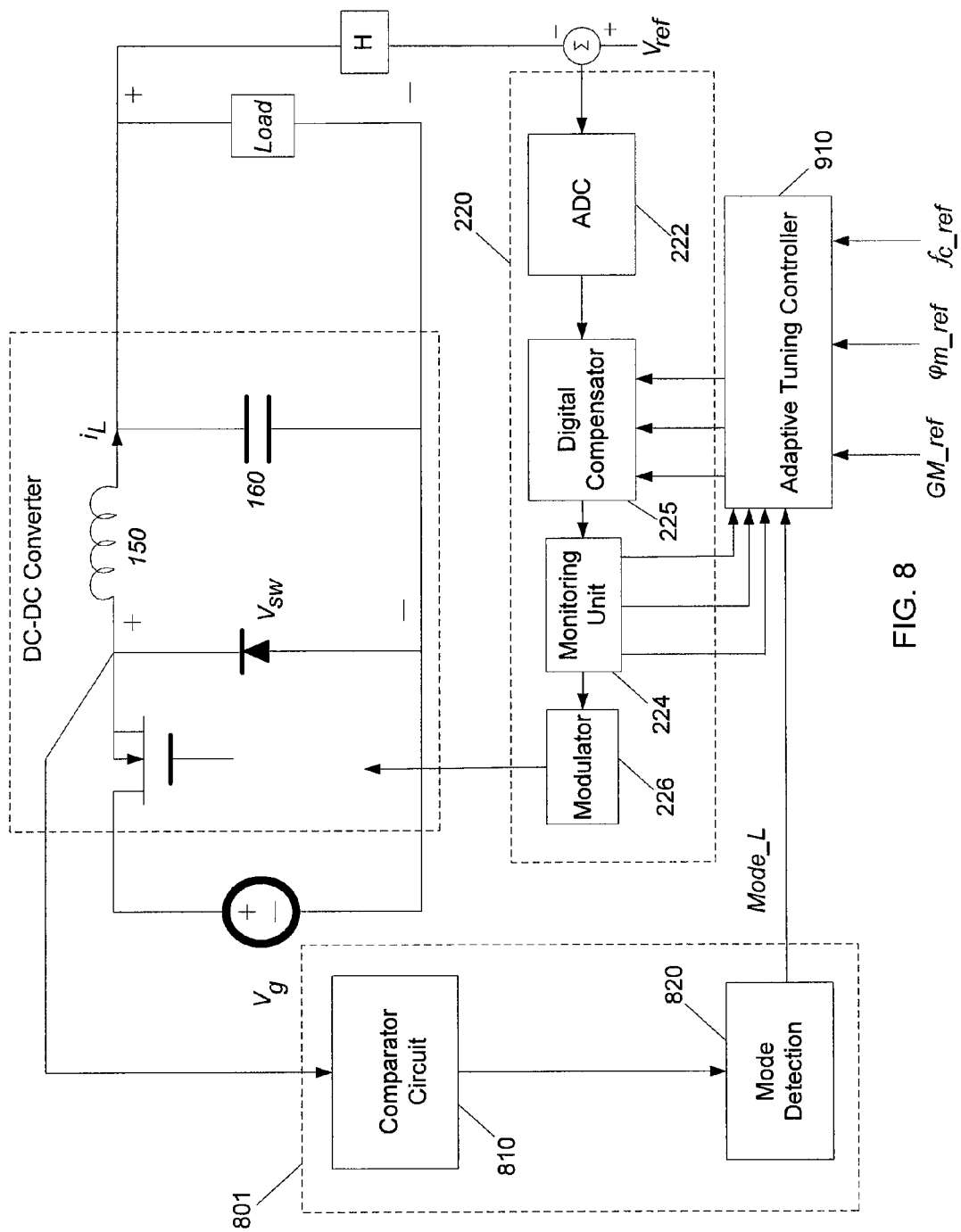
FIG. 8 illustrates an exemplary mode selection system in an exemplary power regulation system.

In accordance with an exemplary embodiment, and with reference to FIG. 8, a digital controller further comprises a mode selection system 801. Mode selection system 801 is configured to automatically adjust for changes in the converter operating mode. For example, mode selection system 801 may facilitate the switch from continuous conduction mode (CCM) and discontinuous conduction mode (DCM). In an exemplary embodiment, mode selection system 801 comprises a mode comparator circuit 810 and a mode detection circuit 820.

Figure 10A:
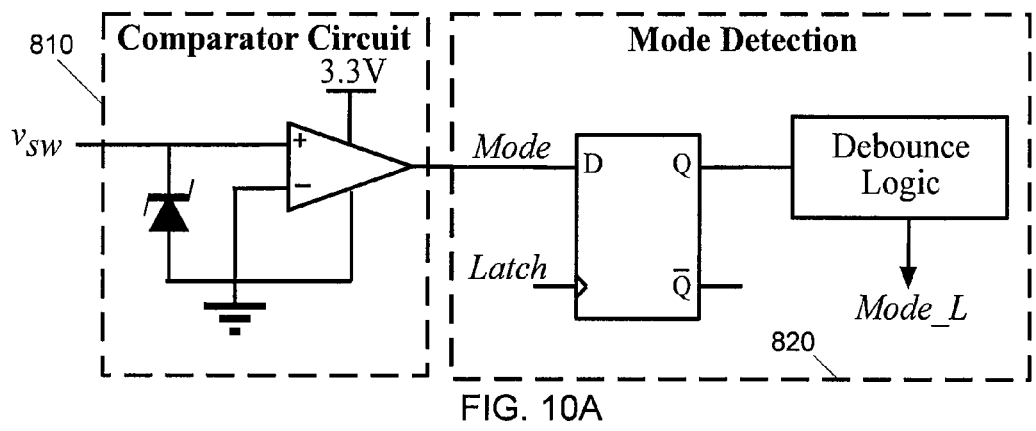
FIGS. 10A and 10B illustrate an exemplary mode selection system and graphical representation of detection waveforms during a mode transition.
Figure 10B:
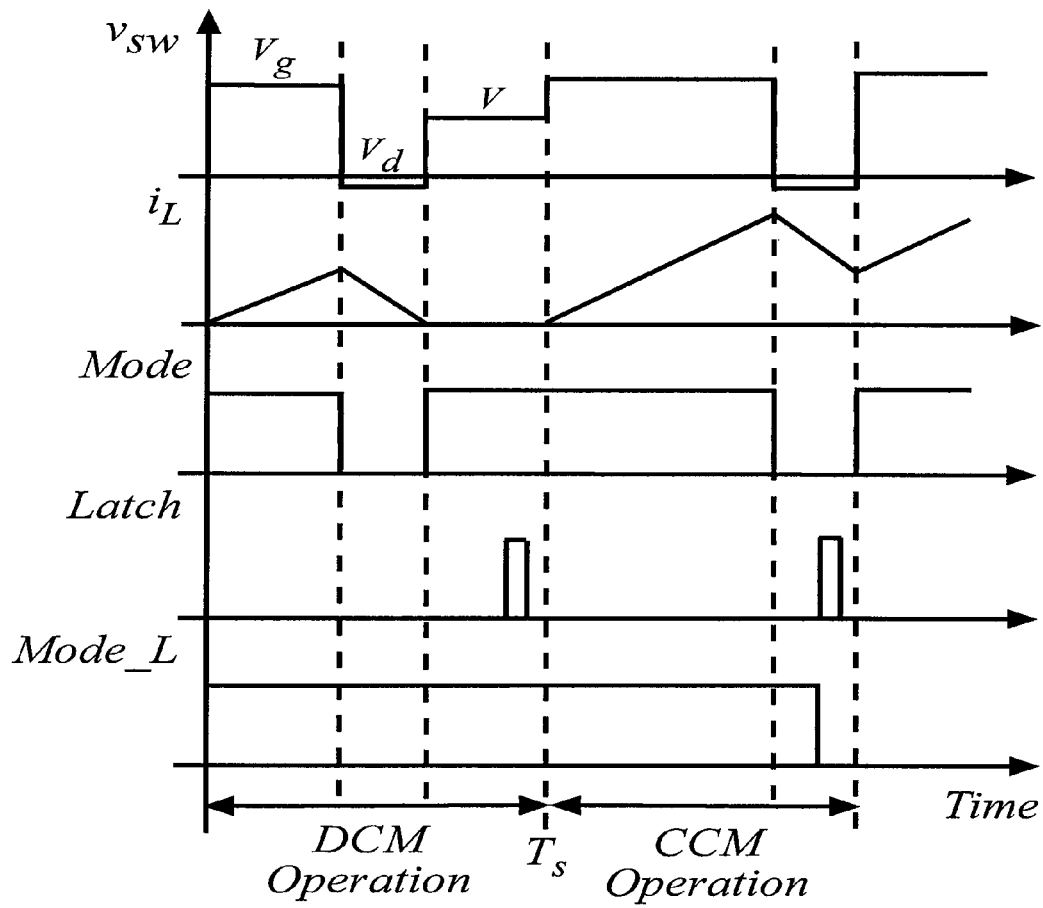

With reference to FIGS. 10A and 10B, in an exemplary embodiment of mode comparator circuit 810 applied to the DC-DC converter shown in FIG. 8, the switched-node voltage is compared to ground, and outputs a high or low voltage, Mode. The Mode signal of mode comparator circuit 810 is transmitted to mode detection circuit 820. In an exemplary embodiment, mode detection circuit 820 samples the Mode signal immediately before the rising edge of digital modulator 226. Moreover, in accordance with an exemplary embodiment, if the Mode signal is high at this instant, power converter 210 is operating in DCM. If the Mode signal is low at this instant, power converter 210 is operating in CCM. In addition, various suitable methods of detecting the mode may be used as would be known to one skilled in the art.

In another exemplary embodiment, mode detection circuit 820 further comprises a debouncer logic circuit configured to provide a form of hysteresis in the mode detection. This is beneficial if power converter 210 fluctuates to or from DCM or CCM before settling into steady-state operation. In the exemplary embodiment, the output of mode detection circuit 820 latches for a certain number of cycles upon a change in operation mode. For example, the output of mode detection circuit 820 may be maintained for six cycles in response to an operation mode change. This filters out mode fluctuations that may occur during the cycle period.

Figure 9:
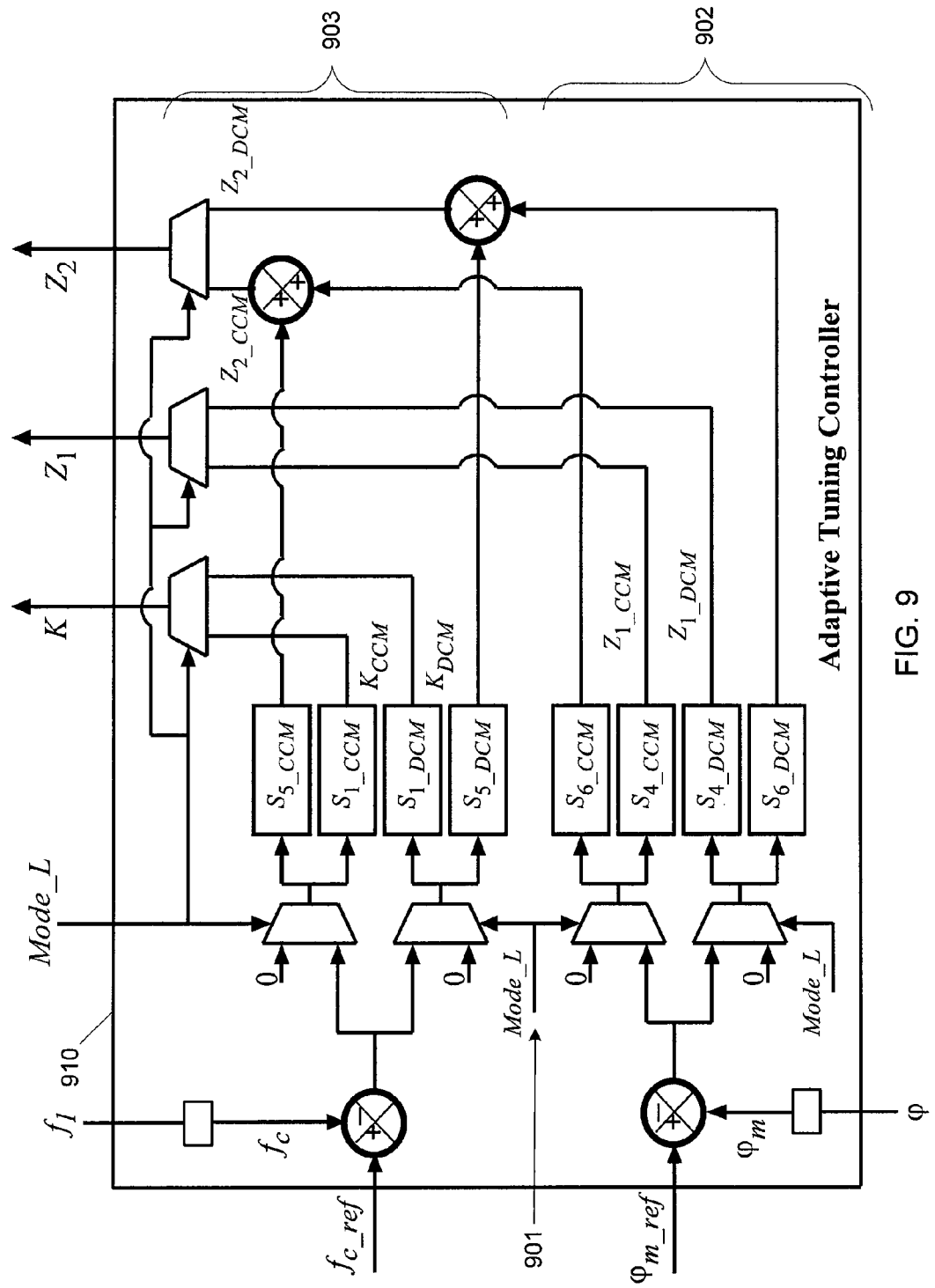
FIG. 9 illustrates an exemplary adaptive controller with mode selection capability.

Furthermore, in an exemplary embodiment and with reference to FIG. 9, an adaptive tuning controller 910 is modified if the digital controller comprises mode selection system 801. Adaptive tuning controller 910 is similar to adaptive tuning controller 710 as previously described. In an exemplary embodiment, modified adaptive tuning controller 910 maintains two distinct sets of compensator parameters. In an exemplary method, the proper set of parameters is loaded into digital compensator 225 based on a mode signal 901 from mode selection system 801. In other words, if the converter is operating in CCM, then CCM compensator parameters are loaded into digital compensator 225. For example, digital compensator parameters may include values specific to CCM operation and values specific to DCM operation. In another exemplary embodiment, gain margin parameters are specific for CCM and DCM operation as well.

Referring back to the description of the MIMO compensator S(z), in the exemplary embodiment, S(z) is replaced with a CCM operating transfer matrix, $S_{CCM}(Z)$ or a DCM operating transfer matrix, $S_{DCM}(Z)$ as appropriate. In an exemplary embodiment, other suitable transfer matrices may be used for other modes. In accordance with the exemplary method, the transfer matrices are used to process stability margin errors during the corresponding mode of operation. For example, $S_{CCM}(Z)$ is used during CCM, while the outputs of $S_{DCM}(Z)$ remain unchanged. In response to the digital controller changing modes, the parameters of digital compensator 225 are caused to switch by adaptive tuning controller 910 so that the output of digital compensator 225 corresponds to the correct mode of operation. For additional detail, review "Robust Adaptive Tuning of Digitally Controlled Switched Mode Power Supplies", written by Jeff Morroni, Luca Corradini, Regan Zane, and Dragan Maksimovic, which is hereby incorporated by reference.

It should be appreciated that the particular implementations shown and described herein are illustrative of various embodiments of the invention including its best mode, and are not intended to limit the scope of the present invention in any way. Indeed, for the sake of brevity, conventional techniques for signal processing, data transmission, signaling, and network control, and other functional aspects of the systems (and components of the individual operating components of the systems) may not be described in detail herein. Furthermore, the connecting lines shown in the various figures contained herein are intended to represent exemplary functional relationships and/or physical couplings between the various elements. Many alternative or additional functional relationships or physical connections may be present in a practical power regulator system.

The present invention has been described above with reference to exemplary embodiments. However, those skilled in the art having read this disclosure will recognize that changes and modifications may be made to the embodiments without departing from the scope of the present invention. These changes or modifications are intended to be included within the scope of the present invention, as expressed in the following claims.

What is claimed is:

1. A monitoring unit associated with a digital controller configured to regulate a power signal of a power converter, the monitoring unit comprising:
    a stability margin monitor; and
    a summer configured to inject an injection signal into a feedback path in the digital controller;
    wherein the stability margin monitor measures at least one feedback signal in the feedback path of the digital controller;
    wherein the monitoring unit outputs at least one of a phase margin signal, a gain margin signal, a gain margin frequency signal, and a crossover frequency signal associated with a frequency response of the power converter; and
    wherein the at least one of the phase margin signal, the gain margin signal, the gain margin frequency signal, and the crossover frequency signal is based on the at least one feedback signal.

2. The monitoring unit of claim 1, wherein the stability margin monitor measures the at least one feedback signal before the injection signal is injected in the feedback path.

3. The monitoring unit of claim 1, wherein the stability margin monitor measures the at least one feedback signal after the injection signal is injected in the feedback path.

4. The monitoring unit of claim 1, further comprising an injection amplitude controller in communication with the stability margin monitor, wherein the injection amplitude controller sets the amplitude of the injection signal.

5. The monitoring unit of claim 1, wherein the monitoring unit receives the at least one feedback signal from an analog-to-digital converter and communicates the at least one feedback signal to a digital compensator.

6. The monitoring unit of claim 1, wherein the monitoring unit receives the at least one feedback signal from a digital compensator and communicates the at least one feedback signal to a digital modulator.

7. The monitoring unit of claim 6, wherein the digital modulator is at least one of a pulse width modulator, a frequency modulator, or a phase shifted modulator.

8. The monitoring unit of claim 1, wherein the monitoring unit measures the at least one feedback signal either continuously or discontinuously.

9. The monitoring unit of claim 1, wherein the monitoring unit measures the at least one feedback signal while the digital controller is regulating the power signal of the power converter.

10. The monitoring unit of claim 1, wherein the injection signal is a variable frequency signal, and wherein the power converter is a switched-mode power supply.

11. The monitoring unit of claim 4, wherein the injection signal causes a detectable signal perturbation of +/− one least significant bit (LSB) in amplitude of the power signal or the at least one feedback signal.

12. The monitoring unit of claim 1, wherein the monitoring unit is in communication with an adaptive tuning controller, and wherein the adaptive tuning controller is configured to set at least one compensator parameter of the digital compensator.

13. The monitoring unit of claim 12, wherein the setting of the at least one compensator parameter is based on at least one of the phase margin signal, the gain margin signal, the gain margin frequency signal, and the crossover frequency signal output by the monitoring unit.

14. The monitoring unit of claim 12, wherein the monitoring unit is in further communication with a mode selection system configured to detect a change in an operating mode of the power converter, and wherein the adaptive tuning controller is configured to set the at least one compensator parameter based on the operating mode.

15. The monitoring unit of claim 14, wherein the operating mode of the power converter is at least one of continuous conduction mode (CCM) and discontinuous conduction mode (DCM), and wherein the adaptive tuning controller comprises a CCM parameter set and a DCM parameter set corresponding to the operating mode.

16. The monitoring unit of claim 12, wherein the adaptive tuning controller and the monitoring unit form a portion of at least one of a multi-input multi-output (MIMO) control loop, a single-input multi-output control loop, or a multi-input single-output control loop.

17. A method of regulating a power signal of a power converter, the method comprising:
injecting an injection signal into a feedback path in a digital controller of the power converter;
sampling, at a monitoring unit, at least one feedback signal in the feedback path of the digital controller; and
outputting, from the monitoring unit, at least one of a phase margin signal, a gain margin signal, a gain margin frequency signal, and a crossover frequency signal associated with a frequency response of the power converter;
wherein the at least one of the phase margin signal, the gain margin signal, the gain margin frequency signal, and the crossover frequency signal is based on the at least one feedback signal.

18. The method of claim 17, further comprising:
generating at least one of a phase margin error signal, a gain margin error signal, a gain margin frequency error signal, and a crossover frequency error signal, wherein the phase margin error signal is based on a comparison of the phase margin signal and a phase reference signal, wherein the gain margin error signal is based on a comparison of the gain margin signal and a gain reference signal, wherein the gain margin frequency error signal is based on a comparison of the gain margin frequency signal and a gain margin frequency reference signal, and wherein the crossover frequency error signal is based on a comparison of the crossover frequency signal and a crossover frequency reference signal; and
adjusting at least one operating attribute of the digital compensator based on the at least one of the phase margin error signal, the gain margin error signal, the gain margin frequency error signal, and the crossover frequency error signal.

19. The method of claim 17, further comprising generating the injection signal amplitude based on achieving a desired amplitude perturbation of the power signal or the at least one feedback signal.

20. A method of digital control of a power converter, the method comprising:
receiving operating attributes at an adaptive tuning controller, wherein the operating attributes include at least one of a crossover frequency, a gain margin frequency, a phase margin, and a gain margin;
generating adjusted operating attributes; and
transmitting the adjusted operating attributes to a digital compensator, wherein the digital compensator generates a digital feedback signal based in part on the adjusted operating attributes, and wherein the digital feedback signal modifies the regulating of a power converter.

21. The method of claim 20, wherein the modification of the regulating of the power converter occurs while the power converter is regulating a power signal.

22. The method of claim 20, wherein the adaptive tuning controller generates the adjusted operating attributes based at least in part on the determined power converter operating mode.

* * * * *